March 23, 1965    O. C. HOLDERER    3,174,335
WIND TUNNEL SEAL

Filed April 6, 1962    2 Sheets-Sheet 1

Oscar C. Holderer,
INVENTOR.

BY S. J. Rotondi
A. T. Dupont
David H. Ward

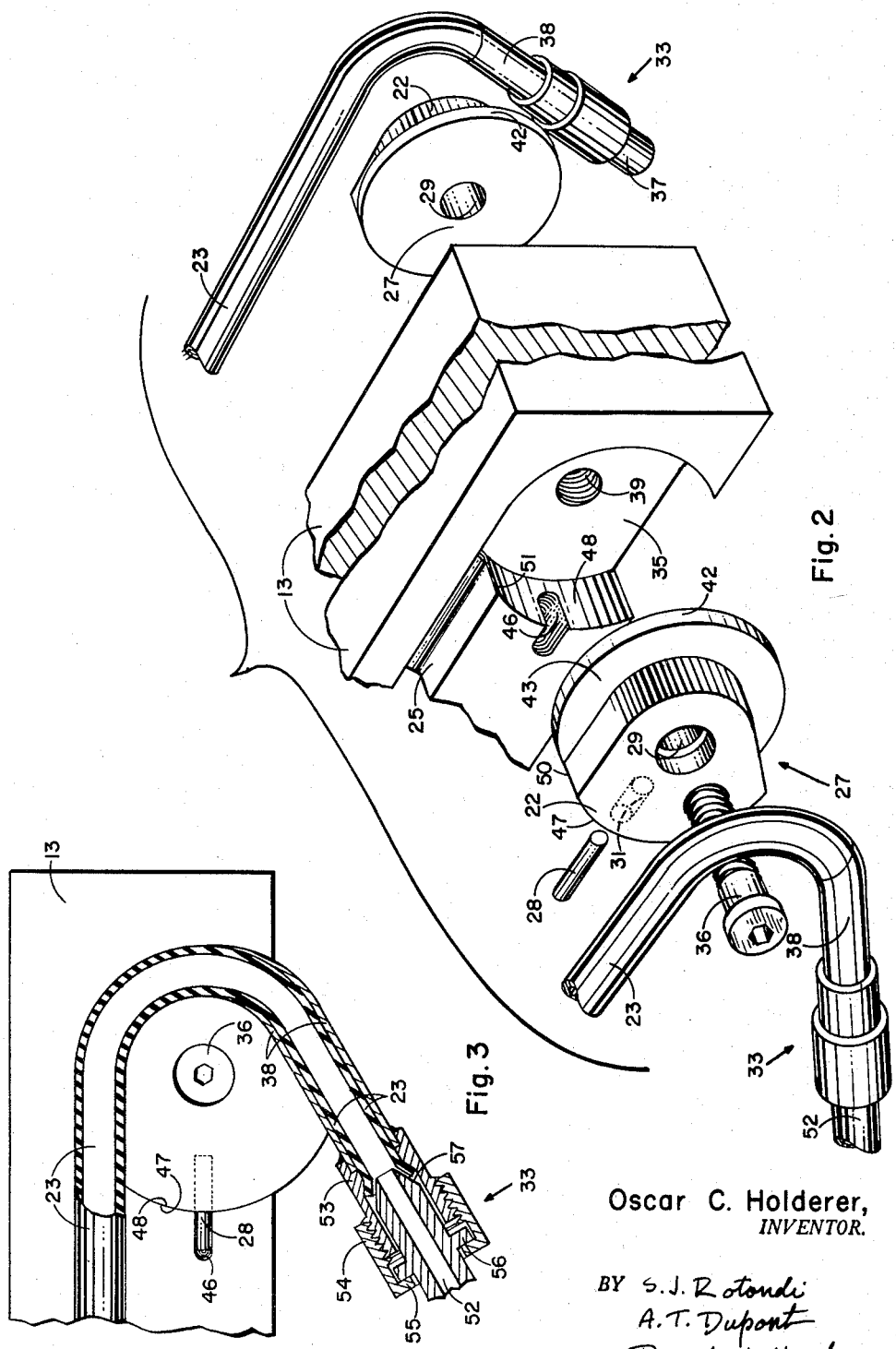

United States Patent Office 3,174,335
Patented Mar. 23, 1965

3,174,335
WIND TUNNEL SEAL
Oscar C. Holderer, Huntsville, Ala., assignor to the United States of America as represented by the Secretary of the Army
Filed Apr. 6, 1962, Ser. No. 185,736
4 Claims. (Cl. 73—147)
(Granted under Title 35, U.S. Code (1952), sec. 266)

The invention described herein may be manufactured and used by or for the Government for governmental purposes without the payment of any royalty thereon.

This invention relates to inflatable seals and more particularly to a device for permitting quick replacement of inflatable sealing tubes used in wind tunnels.

Inflatable seals comprising a rubber tube inserted in a retaining groove are widely used in experimental aerodynamic test facilities. For example, such seals are used along the contour of nozzles and around the periphery of access doors in wind tunnels. Inflatable seals can be advantageously used where a leak-proof seal must be established between two adjacent surfaces separated by a finite gap over which a given pressure differential is applied and where the sealing must be accomplished without requiring motion between the surfaces to be sealed (as is necessary for gaskets, O-rings, etc.). Further, the seal must be free to retract from sealing contact so as to permit a sliding motion between the two surfaces without restraint from the seal or damage to it. Obviously, static seals such as O-rings or gaskets cannot fill these requirements since in order to seal they require "squeeze" which presupposes a compressive motion between the surfaces forming the gap to be sealed. By the use of ordinary rubber tubing (such as latex surgical tubing) inflated by a fluid under pressure, usually air, the finite gap can be closed and sealed without compressive movement of the two surfaces.

One of the problems encountered in the use of inflatable seals is the difficulty in their replacement. This is particularly true in the case of wind tunnel nozzles, which are frequently replaced by nozzles of a different design and dimensions.

Another problem exists where a continuous periphery, such as found along the contour of wind tunnel nozzles, must be sealed. Here, one end of the sealing tube must be connected to a pressure source, yet be arranged to form a continuous seal along the contour of the wind tunnel nozzles.

It is the object of this invention to provide a device which facilitates the replacement of inflatable sealing tubes.

According to the present invention, the foregoing and other objects are attained by providing in a wind tunnel a continuous seal in the form of an inflatable sealing tube disposed in a groove extending around the peripheries of each of a pair of nozzle blocks. A pair of removable annular plates are provided in recesses at one end of each nozzle block to facilitate the replacement of the sealing tubes.

The invention will be more fully understood through the following detailed description taken in conjunction with the accompanying drawings wherein:

FIGURE 2 is a perspective view of the annular retaining plates.

FIGURE 3 is an elevational view partially cut away of the connector.

Figure 1:
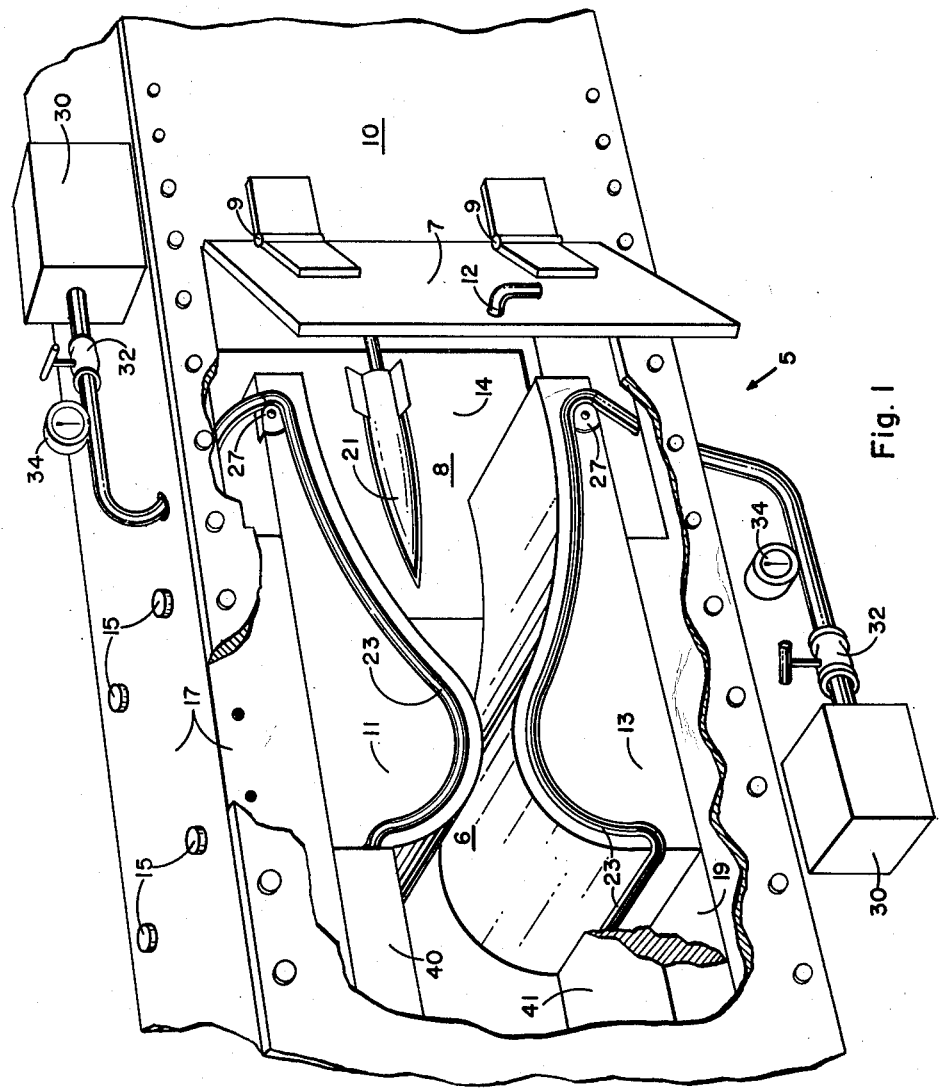
FIGURE 1 is a perspective view partially cut away of a wind tunnel having an access door opening adjacent to the ends of a pair of nozzle blocks.

Referring to FIGURE 1 the numeral 5 designates a wind tunnel assembly having an access door 7 pivotally mounted by hinges 9 on the front wall 10 of the wind tunnel. A suitable latch as indicated by handle 12 is used to retain the door in a closed position. Door 7 and a similar door 14 shown mounted in a corresponding position on the rear wall of the wind tunnel provide access to the inside of the wind tunnel for manipulating the test specimen and also for mechanically connecting or replacing the terminal ends of the inflatable sealing tubes. A pair of nozzle blocks 11, 13 are secured by a plurality of bolts 15 to the roof 17 and base 19 respectively of the wind tunnel. Each of the nozzle blocks has identical interfacing surfaces which form a converging throat area 6 adjacent one end of the blocks and a diverging cavity area 8 adjacent the other end of the nozzle blocks. A test specimen 21 is shown positioned within the diverging cavity area. To insure an air-tight seal between the sides of nozzle blocks 11, 13 and wall 10 an inflatable sealing tube 23 is disposed in a rectangular groove 25 (FIGURE 2) around the periphery of the nozzle blocks. A pair of metal blocks 40 and 41 are suitably attached to the roof and base respectively of the wind tunnel to provide a sealing surface for inflatable sealing tubes 23 contained in grooves 25 which extend across the end of nozzle blocks 11, 13 adjacent throat area 6. One end of sealing tube 23 associated with each of nozzle blocks 11 and 13 is connected to an air supply 30. A three-way control valve 32 and a pressure gauge 34 are connected between one end of tube 23 and pressure source 30 to regulate and indicate the amount of air pressure applied to the inflatable tube. Since the other end of tube 23 terminates in a plug 37 (see FIGURE 2), the three-way valve allows for deflation of the tube when desired. An annular recess is provided on the front and rear sides of nozzle blocks 11, 13 for housing an annular retaining plate 27 which is removably secured therein.

Referring to FIGURE 2 the terminal ends of sealing tube 23 are shown extending around annular retaining plates 27 on the front and rear sides of nozzle block 13. Each of the plates 27 comprises an annular flange 42 and an integral bell-shaped member 22. Flange 42, which fits in a recess 35 on the nozzle block, has a thickness such that the inner surface of groove 25 is flush with the outer surface 43 of this flange. The retaining plate has a central opening 29 co-axially aligned with a threaded opening 39 in the nozzle block. Opening 29 is counterbored within member 22 to house the head of a screw 36 which extends through opening 29 to secure plate 27 to the nozzle block. The bell-shaped member has an aperture 31 which is co-axially aligned with an opening 46 in the nozzle block. One end of a dowel pin 28 is inserted in aperture 31 and the other end fits in opening 46 to prevent rotation of the retaining plate. When the retaining plate is secured in recess 35, base surface 47 of member 22 fits flush with inner surface 48 of the nozzle block. One edge 50 of member 22 mates with the bottom edge 51 of groove 25 to eliminate any void between edge 51 and retaining plate 27 into which the inflatable tubing might protude. One end of the sealing tube is inclosed by a metal tubing 38 and terminates through a connector 33 in a plug 37. As shown in FIGURE 2, metal tubing 38 is secured to surface 47 of retaining plate 27 by a suitable means, such as brazing. The metal tubing prevents inflation of the sealing tube at points where no sealing is required and also prevents excess chaffing and damage to the tube. The other end of tube 23 extends around bell-shaped member 22 where it also is enclosed by metal tubing 38. The tubing is removably secured to a connector 33 positioned below plate 27, which in turn is drawn through base 19 (FIGURE 1) of the wind tunnel, and connected to an air supply through a pressure gauge and a three-way control valve located outside the wind tunnel.

In FIGURE 3 the numeral 33 indicates the connector which joins sealing tube 23 to a metal supply tube 52. Tube 23 has a flared end which fits over a bevelled end surface 57 of tube 52. A sleeve 53 encloses both ends of tubes 23 and 52. The sleeve has flared inner surface which is adapted to engage the flared outer surface of tube 23. One end of the sleeve is soldered or suitably secured to the outside metal tubing 38 covering the sealing tube. The other end of sleeve 53 is externally threaded for engagement with the internal threads of a retaining nut 54. The retaining nut has a flanged end 55 which engages an outwardly projecting shoulder 56 on the tube 52. Thus to engage or disengage tubes 23 and 52 the retaining nut is either threaded on or off sleeve 53. The plug 37 which is shown in FIGURE 2 is formed by changing tube 52 into a short, solid member which fits into connector 33 in the same manner as tube 52. Thus, it should be readily apparent that the applicant has provided a device which advantageously permits assembly of the seal prior to installation of the seal in the wind tunnel. The seal may be assembled to a predetermined length remote from the wind tunnel to provide quick and easy replacement thereof.

Obviously, numerous modifications and variations of the present invention are possible in light of the above teachings. It is therefore to be understood that within the scope of the appended claims the invention may be practical otherwise than as specifically described herein.

I claim:
1. A sealed wind tunnel assembly comprising:
   (a) a pair of nozzle blocks secured respectively to the roof and base of a wind tunnel,
   (b) each of said nozzle blocks having identical interfacing convex and concave surfaces to form a converging throat area adjacent to one end of said blocks and a diverging cavity area adjacent the other end of said blocks;
   (c) a first groove extending along the contour of the front and rear sides and across said one end of each of said nozzle blocks;
   (d) a resilient inflatable sealing tube disposed in said groove;
   (e) an annular recess disposed on the front and rear side of each of said nozzle blocks adjacent said other end;
   (f) a sealing tube retaining member removably secured in each recess on said nozzle blocks and including a tubular member disposed for enclosure of each of the ends of said sealing tubes to prevent inflation thereof, said retaining member forming a second groove which is aligned with said first groove;
   (g) one end of said sealing tube passing through said second groove on the rear side of said nozzle block and terminating in a plug within said wind tunnel and the other end of said sealing tube passing through said second groove on the front side of said nozzle block and terminating at a pressurized air source without said wind tunnel.

2. A device as set forth in claim 1 wherein each of said seal retaining members comprises:
   (a) an annular retaining plate having a central aperture therein;
   (b) a screw extending through said aperture for threaded engagement with said nozzle block;
   (c) said plate having a flange on one side for engagement with said recess and an integral bell-shaped member on the other side to provide said second groove within said recess for retaining said sealing tube.

3. A device as set forth in claim 1 having:
   (a) connecting means removably attached to the ends of said sealing tubes to facilitate replacement of said tubes.

4. A device as set forth in claim 3 wherein said connecting means includes:
   (a) a supply tube provided with a shoulder adjacent its outlet end;
   (b) a sleeve externally threaded on one end and affixed at its other end to the distal end of said tubular member, said sleeve disposed for receiving the outlet end of said supply tube in said one end;
   (c) a retaining nut disposed against said shoulder and threadably engaging said sleeve for maintaining said supply tube within said sleeve and sealing said outlet end of said supply tube against the inlet end of said sealing tube.

References Cited by the Examiner
UNITED STATES PATENTS

| 2,486,287 | 10/49 | Jackson | 73—147 X |
| 2,696,110 | 12/54 | Eggers | 73—147 |
| 2,943,874 | 7/60 | Valdi et al. | 277—34 |

RICHARD C. QUEISSER, *Primary Examiner.*

DAVID SCHONBERG, *Examiner.*